Figure 1:
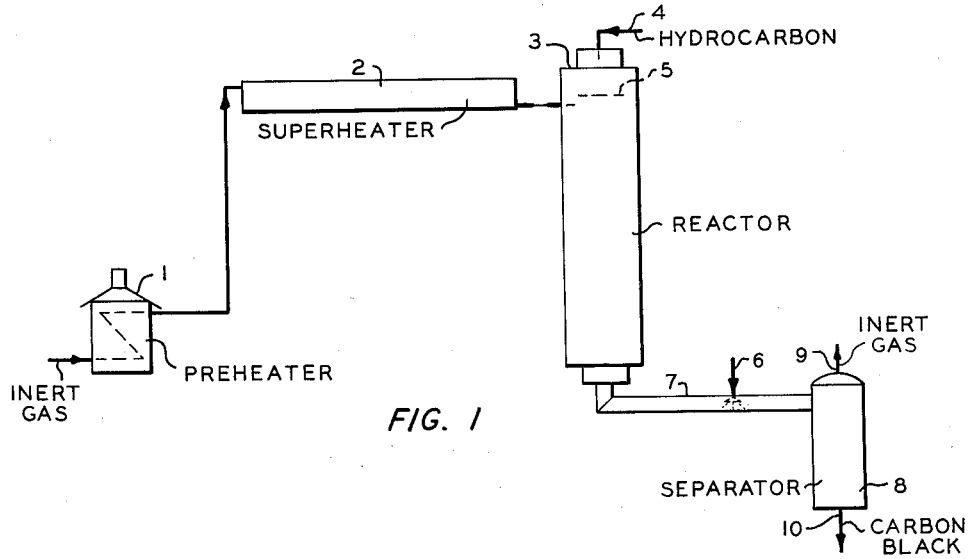

Jan. 2, 1962     F. E. FREY     3,015,543
CARBON BLACK PROCESS AND APPARATUS
Filed June 6, 1958     3 Sheets-Sheet 1

FIG. 1-A

INVENTOR.
F. E. FREY
BY
ATTORNEYS

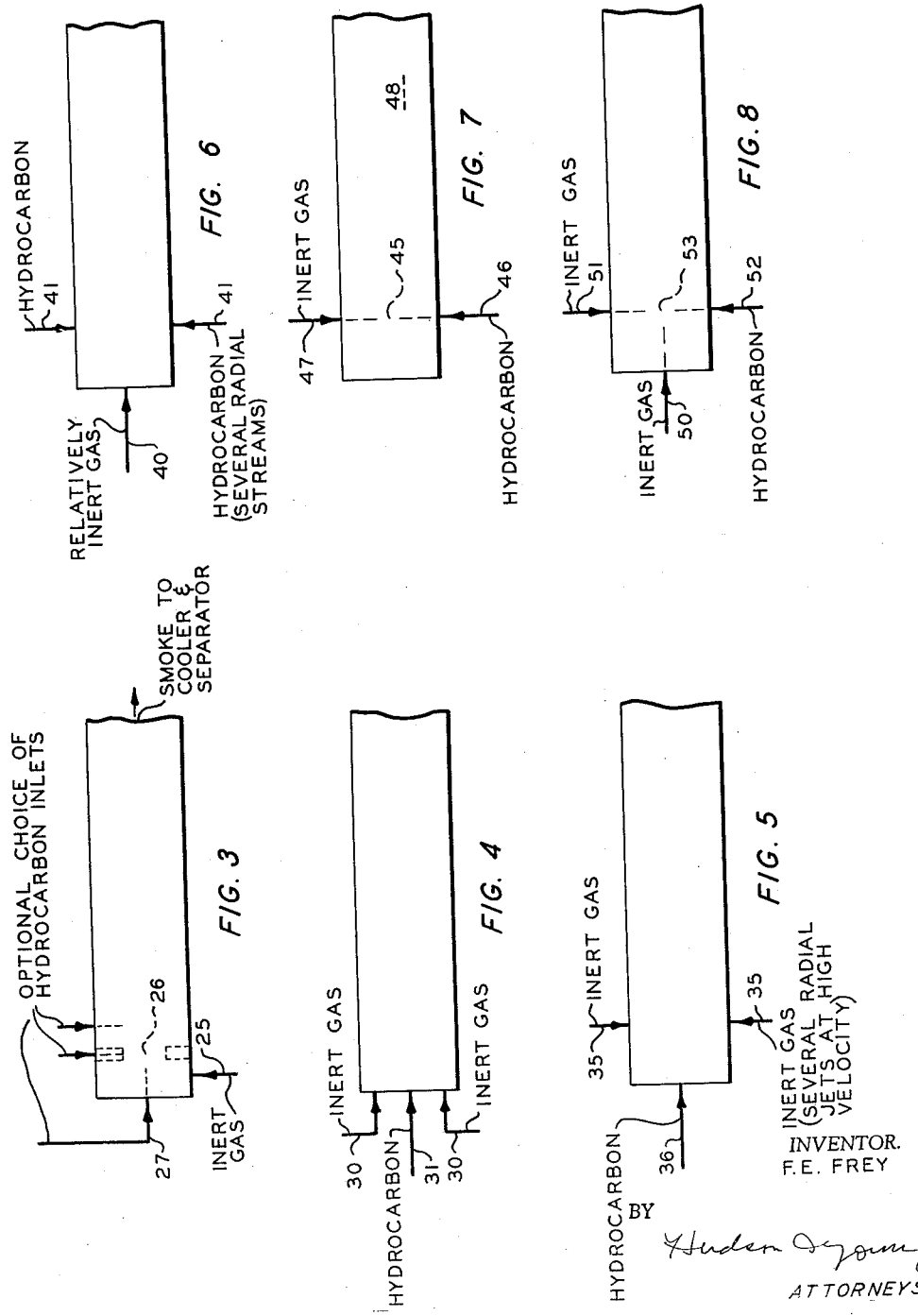

Jan. 2, 1962 F. E. FREY 3,015,543
CARBON BLACK PROCESS AND APPARATUS
Filed June 6, 1958 3 Sheets-Sheet 3
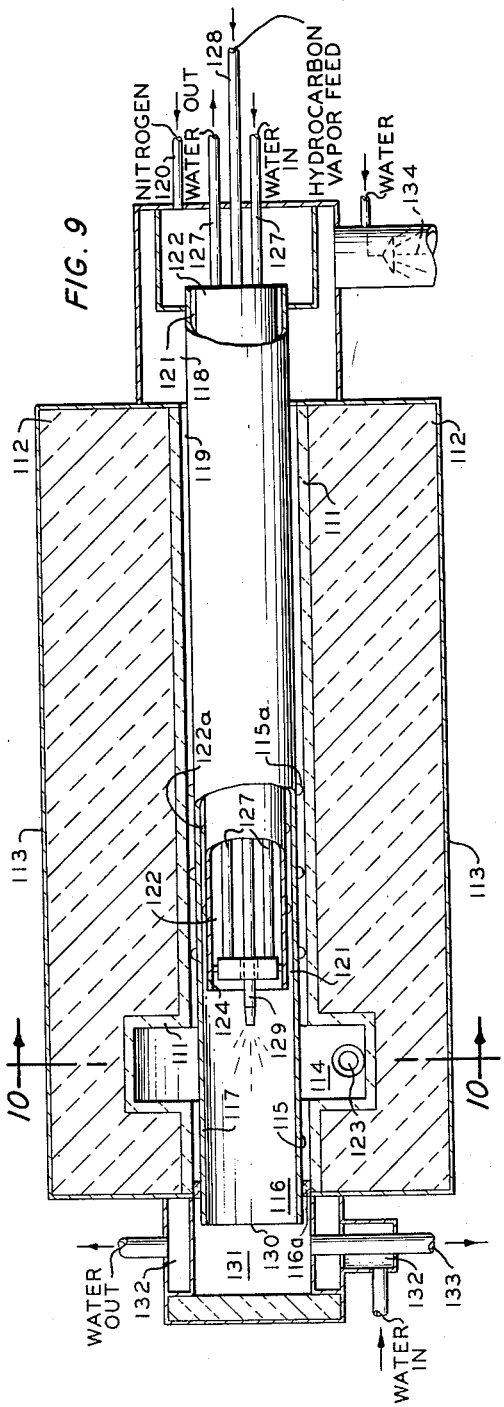
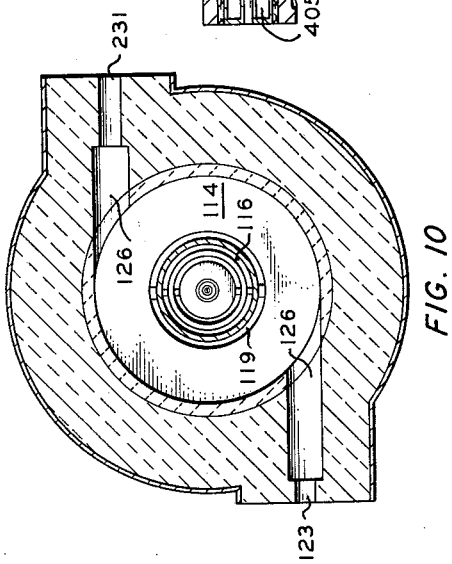
INVENTOR.
F.E. FREY
BY
*Hudson Young*
ATTORNEYS //patent

United States Patent Office 3,015,543
Patented Jan. 2, 1962

3,015,543
CARBON BLACK PROCESS AND APPARATUS
Frederick E. Frey, Bartlesville, Okla., assignor to Phillips Petroleum Company, a corporation of Delaware
Filed June 6, 1958, Ser. No. 740,454
7 Claims. (Cl. 23—209.4)

This invention relates to the production of carbon black. In one of its aspects, the invention provides a process for the production of carbon black wherein an organic compound such as a hydrocarbon which can be decomposed or cracked to produce carbon black is flowed into a reaction zone into a hot, relatively inert gas flowing, in a preferred embodiment of the invention, in turbulent flow along a curved path whereby superfast transverse dispersion of hydrocarbon across the turbulent, relatively inert gas stream is obtained. In another of its aspects, the invention relates to an apparatus wherein there is provided a substantially cylindrical combustion chamber and appended annulus, adapted to generate and to flow through the annulus a hot combustion gas, a reaction chamber disposed within said combustion chamber and forming said annulus therewith, a corebuster substantially concentrically disposed in one portion of said reaction chamber, means for introducing a hot gas through a second annulus formed between said reaction chamber and said corebuster, means for introducing a hydrocarbon to be converted to carbon black into said reaction chamber substantially at the place along its length at which the corebuster terminates therein and means for removing gaseous decomposition products from said reaction chamber. In another of its aspects, the invention relates to producing carbon black of small ultimate particle size by introducing into a stream of hot gas, low in its content of the normal products of combustion, which are carbon dioxide and water, a hydrocarbon which will crack to produce carbon black at a very high velocity of turbulent flow, high temperature, and short reaction time, thus producing a high yield of carbon black of small ultimate particle size and having strong reinforcing properties in rubber. In another of its aspects, the invention relates to a method which comprises flowing annularly preheated, relatively inert gas in turbulent spiral flow into a reaction zone and introducing also into said reaction zone a hydrocarbon to be converted to carbon black thus to cause rapid admixture and conversion of the hydrocarbon by the heat contained in said gas.

It is old to subject a hydrocarbon to direct heating by heat exchange, whereby carbon black is produced, as in the Thermatomic process. In this process, hydrocarbon is passed through passageways in a preheated ceramic bed, whereby heat is abstracted from the bed and carbon smoke produced in the stream as it passes therethrough. Rate of cracking is limited by the formation of a cooled surface layer on the ceramic through which heat passes from the sub-surface ceramic by slow conduction to the stream. This can produce a black in high yield, approaching 100 percent of the carbon in the stream, but its particle size is rather large and its reinforcing power in rubber is low, producing a tensile strength of 1,000 pounds per square inch more or less when blending it in a typical concentration of 35 percent by weight.

It is also old to admix a hydrocarbon at high velocity with combustion products of hydrocarbon and air or oxygen, whereby carbon smoke is produced. Substantial concentrations of $CO_2$, $H_2O$, or both, which are present in such gas, react with carbon and its precursors to produce CO at the expense of carbon black yield.

The black made at high velocities has high reinforcing properties, producing 4,000 pounds per square inch tensile strength in rubber, more or less; can have a small ultimate particle size, and is of a constitution such that in the compounded rubber high stress is shown at a moderate amount of stretching.

It has now been found that a carbon black of improved properties as set forth and described herein can be prepared employing high velocities of flow in excess of approximately 20 feet per second, preferably in excess of 45 feet per second, of a mixture of heat carrying relatively inert gas and hydrocarbon vapor, the gas being mixed with the hydrocarbon vapor by introducing the hydrocarbon vapor into a spirally flowing turbulent mass of said gas in a reaction zone of fairly small diameter. In the reaction zone the intermixing is essentially immediately accomplished and the residence time in the zone can be sharply limited, thus yielding an efficient, economical, high conversion factor modus opreandi for producing carbon black.

Certain designs, construction and operations which in one manner or another, as are described herein, have also been provided according to the invention.

An object of this invention is to provide a method for the production of carbon black. Another object of this invention is to provide an apparatus for the production of carbon black. It is an object of this invention to provide a method and apparatus for the production of carbon black in high yield and of small ultimate particle size. It is another object of this invention to provide a carbon black having strong reinforcing properties in rubber.

Other aspects, objects and the several advantages of the invention are apparent from this disclosure, the drawings, and the appended claims.

According to the present invention there is provided a process and apparatus for the production of carbon black which comprises cracking an organic compound or hydrocarbon which yields carbon black under carbon black producing conditions of temperature, pressure, and flow rate by flowing the hydrocarbon, preferably as a vapor, into a hot relatively inert gas flowing in turbulent flow along a curved path whereby superfast transverse dispersion as herein defined of hydrocarbon or compound across the turbulent relatively inert gas stream is obtained. The rate of flow of the gas and vapor mixture is at least about 20 feet per second.

In one of its forms, an apparatus according to the present invention consists of a series of concentrically disposed elements, a cylindrical combustion zone having an annulus appended thereto, a reaction tube within said zone and forming said annulus, a corebuster extending throughout a portion of said reaction tube, means for regulating the heat transmitted from said combustion zone and annulus to the corebuster within said reaction tube and means for introducing a charge to be cracked to carbon black through said corebuster into the reaction zone within said reaction tube and means for collecting carbon black produced in said reaction tube.

While it is preferred, as above noted, to provide for means to control the temperature of the feed to be fed through the corebuster, it is within the scope of the invention to so design the relative sizes of apparatus elements that the hydrocarbon or other feed will reach vapor phase when this is desired and a desired temperature just as it leaves the corebuster. In such event, means for cooling or otherwise adjusting the temperature in the corebuster can be dispensed with.

The present invention produces a new result over the prior art in that there results a very high yield of a carbon which imparts high tensile strength to rubber and, while maintaining high tensile strength, permits production of a rubber product exhibiting moderate stress at a moderate stretch.

The essential features of the process of the invention are: (1) the use of heated relatively inert gas, $N_2$, $H_2$, CO or their mixtures, with little or no $CO_2$ or $H_2O$, flowing in a turbulent spiral flow, (2) rapidly admixing hydrocarbon with this so flowing preheated gas using a passageway of small cross section whereby linear velocities of at least 20 feet per second and, preferably, at least 45 feet per second, in the gas are imposed to effect thermal cracking to carbon black very rapidly, (3) effecting the reaction at an optimum temperature within the ranges 2300° F. to 3500° F. in a reaction time of under 0.1 second.

Figure 11:
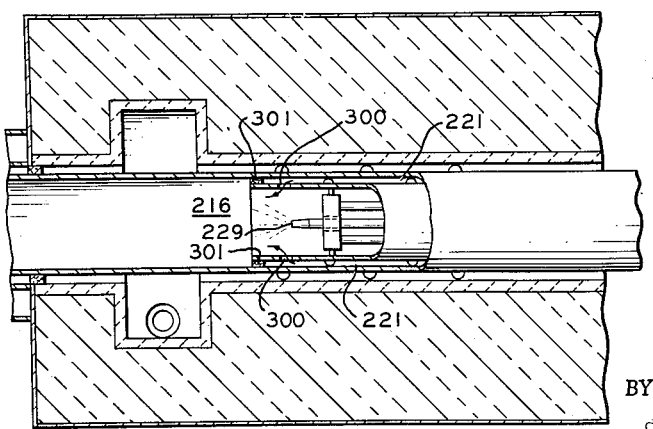

Embodiments and variations of embodiments of this invention are given in FIGURES 1 through 12 which illustrate diagrammatically or schematically various arrangements in which one or more of the several concepts of the invention can be embodied. FIGURES 9 and 10 are, respectively, vertical cross sections of an actual apparatus taken in a plane passing through the axis and a plane at right angles thereto. FIGURE 11 is a modification of the apparatus as shown in FIGURES 9 and 10. FIGURE 12 is a cross sectional view of a corebreaker adapted to be used in the apparatus of FIGURE 9.

In FIGURE 1, which is a schematic showing of one embodiment of the invention, 1 is a conventional preheating furnace in which the inert gas, nitrogen in this embodiment, is preheated. The preheater can be omitted if desired and the gas can be available already sufficiently hot for its intended use. Superheater 2 is operated by indirect heat exchange through a ceramic wall. In a variation, it can be operated by electric heating by electric discharge or resistors. A small amount of oxygen, preferably preheated, can be added to the hydrocarbon feed in the reactor to boost the temperature slightly when the reactor temperature is already in a high temperature range.

In the modification being described, there is provided, at the beginning of the reaction zone 3, a constriction producing the required velocity of inert gas of at least 20 feet per second.

Variations of zones 1 and 2 include a pebble heater to produce hot inert gas, a blow-and-run refractory heating plant using two or more units operating on staggered cycles of combustion heating alternating with superheating of the inert gas. Blending exit inert gas on a controlled varying ratio can be used to hold downward drift of superheat temperature in a suitable range to control efficiency and black quality.

In an important combination of operations according to this invention, by feeding oxygen or preheated air or air enriched with oxygen to a preheated coke bed, operating above 2600° F., $N_2$ and CO are formed while the formation of much deleterious $CO_2$ is avoided. Preheated CO in addition can be introduced through the bed.

Reaction zone 3 is substantially vertically disposed. The heated relatively inert gases are introduced substantially tangentially in a manner to create along the inner wall of zone 3 a downwardly moving blanket of turbulent gases flowing in a curved path. Hydrocarbon vapor to be converted, in this embodiment benzene heated to about 2500° F., is introduced substantially axially at the top of reaction zone 3 through pipe 4. The relative sizes of the reaction pipe and volumes of gases at the operating temperature are chosen to maintain not only the turbulent curved path flow of the relatively inert gases but also to cause the introduced hydrocarbon to be immediately (superfast) admixed therewith. To this end, the relative velocities of the relatively inert gas and hydrocarbon are adjusted to allow the hydrocarbon to pick up sufficient angular velocity from the relatively inert gas as to be impelled thereinto by centrifugal force, the turbulent flow of said relatively inert gas then immediately causing the desired mixing to take place with great uniformity. As an especial feature of the invention, shown also in FIGURE 1A, the hydrocarbon can be made to flow over a ceramic plate 5 thus causing the hydrocarbon to be moving in a film which is immediately sheared into the turbulently flowing hot relatively inert gas. By pointing the constricted portion of tube 2 slightly downwardly increased "shear" of the gases can be obtained. The length of the reactor, its diameter, etc., are so proportioned that the reacted hydrocarbon streams can be immediately cooled to below 1200° F., preferably 800° F., at the end of the desired residence time which in this embodiment is 0.1 second. A water spray 6 is provided in tube portion 7 at the point at which the reacted hydrocarbon is cooled sufficiently by itself due to endothermic reaction and radiant and convection heat loss, that undesirable reaction between the carbon black and the water spray will not occur. In separator 8, which is conventional, gaseous products are removed at 9 and carbon black is recovered at 10. The relatively inert gas used in this embodiment is essentially nitrogen and it can be recovered from the separator and can be returned at least in part to preheater 1.

Figure 2:
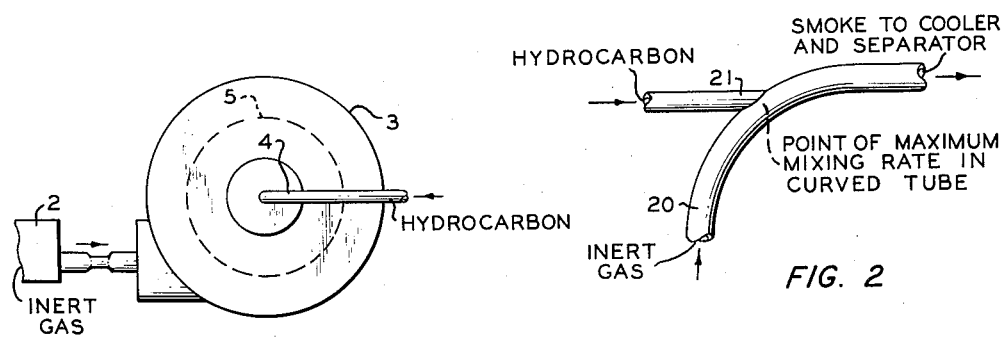

Other embodiments of reaction zone 3 are shown in FIGURES 2 through 9. FIGURE 2 shows admixing the hydrocarbon with the relatively inert gas at the point of maximum mixing rate in a curved tube. Thus, the hydrocarbon is introduced into tube 20 by pipe 21. The curved nature of tube 20 causes the relatively inert gas to spiral. In FIGURE 3 the spiralling, hot, relatively inert gas introduced at 25 is passed through a constricted passageway 26 together with hydrocarbon axially introduced through pipe 27. FIGURE 4 shows both relatively inert gas and hydrocarbon entering axially at high velocity. The relatively inert gas is fed to the reactor through pipes 30 which are oriented to cause said gas to move in a spiral path in turbulent flow. Hydrocarbon is introduced at 31. FIGURE 5 shows the hydrocarbon entering the reactor axially and the relatively inert gas entering radially at high velocity. Thus, the relatively inert gas is pumped in through pipe 35 and the hydrocarbon is pumped in through pipe 36. There are two or more radial jets 35 to give the desired high velocity. FIGURE 6 shows the relatively inert gas entering the reactor axially at 40 with the hydrocarbon pumped in radially at 41. In this modification, which is used to illustrate the point that the hydrocarbon vapor and inert gas flows can be interchanged, the hydrocarbon stream flows in the highly turbulent curved flow and the relatively inert gas is caused to be admixed therewith. Since the hot relatively inert gases are in considerable excess over the hydrocarbon in the now preferred operations, better mixing is obtained with the other embodiments of the invention in which the gas is on the periphery of the hydrocarbon being admixed therewith. FIGURE 7 shows opposing jets of relatively inert gas and hydrocarbon entering the reactor resulting in fast mixing. The hydrocarbon and the relatively inert gas enter mixing zone 45 through pipes 46 and 47, respectively. Since the inert gas is in considerable excess the gas will govern the overall flow which will be in an essential spiral manner in tube 48. Substantially all of the mixing takes place in zone 45, however. Any slight additional mixing is caused by the spiralling gas, as earlier described. FIGURE 8 shows opposing jets of inert gas and hydrocarbon and a stream of inert gas entering the reactor axially. Thus, the gas enters through pipes 50 and 51 while hydrocarbon is introduced through pipe 52. Mixing immediately occurs in zone 53. The spiralling motion is again obtained due to the excess of gas entering at 51 over the hydrocarbon.

FIGURE 9 is a diagrammatic drawing of the reactor used to obtain the data of this invention which are shown in Table I below. This embodiment is similar to that shown schematically in FIGURE 4.

Referring now to FIGURES 9 and 10, an axially disposed cylindrical section has a lining 111 of highly refractory sillimanite. Between this refractory liner 111 and a cylindrical steel shell 113 is a layer of insulation 112.

Combustion zone 114, coaxial with liner 111, is also lined with lining material 111. In combustion zone 114 are arranged inlets 123 which are so disposed that gas can be passed therethrough and into combustion zone 114 in a direction tangential to its cylindrical wall. Most of the tangentially introduced gas is burned within tunnels 126. Cooling assembly 118 downstream from the cylindrical section and adjacent thereto consists of water jacket (not shown) and water spray 134. A combustion mixture of methane and oxygen or oxygen mixed with steam, or air, is charged to tangential burners 123. Tangentially introduced gas is burned in tunnels 126, the combustion gases thus produced traveling helically within combustion zone 114 and continuing along the annular space 119 formed by the inner wall of liner 111 of the cylindrical section and outer wall 115 of reactor tube 116. A seal 116a is provided between the outer wall of tube 116 at its left end, as shown, and the lining 111. Wall or surface 115 is provided with a helical protrusion 115a which serves to maintain centered outside wall 115 within the apparatus and also serves to force the gases to move spirally throughout the entire length of the annulus 119. The annular space between the reactor tube 116 and the cylindrical section is of uniform width approximately 1¾ inches maximum. The burning taking place in tunnels 126 serves as a source of heat. Sufficient heat is provided to heat the outside wall 115 of reactor tube 116 to a temperature of 2875° F. The gas is passed into cooling assembly 118 (described previously) and rapidly quenched to a temperature below 1200° F. in both indirect and direct heat exchange relation with water.

The inside wall at 117 of reactor tube 116 becomes heated to a temperature of 2750° F. by the hot gases flowing in the annular space 119. Nitrogen gas preheated to 1200° F. (preheater not shown) is introduced through pipe 120 and enters the annular space 121 formed by the corebreaker 122 placed inside the reactor tube 116. This annular space 121 is ⅛ inch in width. The linear velocity of the nitrogen gas in the annular space 121 is at least 100 feet per second. The nitrogen gas becomes heated to a temperature of 2600° F. by the hot inside wall 117 of reactor tube 116. The outside wall at 124 of the corebreaker 122 reaches a temperature of 2700° F. The corebreaker 122 is positioned in reactor tube 116 to assist in obtaining a high ratio of heat-transmitting surface to volume in a tube of large diameter and high throughput. The reactor tube 115 is made of silicon carbide for high heat transfer. The 1¾ inch corebreaker 122 is made of alumina, but might, if desired, be made of other refractory material, such as for example fused quartz, or sillimanite. The corebreaker placed centrally in the reactor tube reduces the effective cross sectional area of the reactor tube. The corebreaker outside surface 122 is provided with spiral ridge 122a which helps to create a spiral motion of the preheated nitrogen gas. Water is circulated in tube 127 positioned in corebreaker 122. The preheated hydrocarbon vapor feed at 250° F. enters tube 128 and is sprayed by orifice 129 into reaction chamber 116. The effluent temperature at 130 in the reaction chamber 116 is 2000° F. The product enters a cooling assembly 131 which consists of water jacket 132 and water spray (not shown). The water spray if used is located sufficiently downstream to allow cooling of the product by the water jacket 132 to a temperature low enough to avoid reaction of water with carbon. An atmospheric cooling pipe can be used in place of a water spray. Such a pipe can also be used with a water jacket. The black is in any event cooled preferably to a temperature at which it will not react with a water spray when such a spray is used but precooling can be small if the volume of spray water is sufficiently large to quench to below reacting temperatures. A water spray is preferred provided the black is cool to such a non-reacting temperature. Any usual means not shown for separating solids from gases can be applied to the downstream end of pipe 133, to separate the carbon black in the course of its production.

It is seen that in the operation of the embodiment of FIGURE 9, both the relatively inert gas, nitrogen, and the hydrocarbon vapor enter the reactor 116 axially at high velocity. In the runs made, there was approximately 100 percent conversion of benzene to carbon black.

The temperature within the reaction chamber 116 can be varied within wide limits, for example, within the range of 2000 to 3300° F. or higher. The upper limit depends on the temperature the refractory material will stand. Better yields of excellent quality carbon black resulted from operating periods when temperatures were of the order of 2300 to 2600° F. in reactor 116. The reaction time was less than 0.1 second.

The reactor 116 was 2 inches in diameter and 18 inches long.

The temperatures during the runs were as follows:

| Location | Temperature, °F. |
| --- | --- |
| Outside wall reactor tube 115 | 2,875 |
| Inside wall reactor tube 117 | 2,750 |
| Corebreaker wall 124 | 2,700 |
| Nitrogen preheat entering annulus 119 | 1,200 |
| Feed preheat 128 | 250 |
| Effluent Temperature 130 | 2,000 |

Data on the runs made with the apparatus of FIGURE 9 are given in Table I.

*Table I*

| Sample No. | Res. Time, milliseconds | N₂, c.f.h. at 1,200 F. | Feed (250° F.) | | Initial Velocities | | Photelometer (CHCl₃) | Nigrometer | N₂ Surface area, M.²/g. |
| --- | --- | --- | --- | --- | --- | --- | --- | --- | --- |
| | | | Hydrocarbon | HC, Gal. per hour | N₂, c.f.h. | Oil Tube, ft./sec. | Reactor, ft./sec. | | |
| 1 | 78 | 270 | Benzene | .045 | 1.9 | 21 | 20 | 97 | 87.9 | 87.6 |
| 2 | 78 | 245 | n-hexane | .10 | 1.9 | 29 | 18 | 73 | 91.6 | 59.0 |
| 3 | | 245 | Benzene | .167 | 1.9 | 53 | 19 | 55 | 88.8 | 71.6 |
| 4 | 115 | 170 | do | .255 | 1.9 | 75 | 13 | 100 | 95.0 | 44.0 |
| 5 | | 270 | do | .045 | 5.9 | 75 | 20 | 99 | 88.6 | |
| 6 | | 270 | do | .150 | 5.9 | 110 | 20 | 95 | 88.3 | |
| 7 | | 270 | do | .150 | 12.0 | 172 | 21 | 99 | 89.0 | |
| 8 | | 270 | do | .150 | 19.0 | 240 | 21 | 95 | 89.3 | |
| 9 | | 270 | do | .150 | 31.0 | 360 | 22 | 41 | 90.9 | |
| 10 | | 300 | do | .150 | 5.9 | 110 | 23 | 89 | 89.2 | |
| 11 | | 400 | do | .150 | 5.9 | 110 | 30 | 79 | 87.0 | |
| 12 | | 500 | do | .150 | 5.9 | 110 | 37 | 94 | 85.0 | |
| 13 | | 600 | do | .150 | 5.9 | 110 | 45 | 89 | 87.0 | |
| 14 | | 600 | do | .150 | 1.2 | 65 | 45 | 80 | 84.9 | |

Referring now to FIGURE 11, there is shown an embodiment of the invention in which the annular hot relatively inert gas is fed into the reaction section 216 substantially at the introduction of the feed at 229. This is accomplished in the instant embodiment by providing at least one set of holes or apertures 300 through which the hot gas is directed towards the axially introduced feed. Although not necessary to each embodiment of this type of construction, in the embodiment of FIGURE 11, the annular space 221 is terminated at its reaction section end by a closure 301. This permits passing all of the annularly introduced gases through the holes 300 as indicated by the arrows.

Referring now to FIGURE 12 which shows a corebreaker adapted to be used in the apparatus of FIGURE 9, 400 denotes the corebreaker body having spiral 401 on its outside surface. Water or other cooling medium is circulated through the corebreaker by way of inlet 402 and outlet 403. At the discharge end of hydrocarbon feed tube 404, namely at 405, the cooling medium circulates around the tube to prevent its temperature from reaching a value at which undesired reaction of the hydrocarbon will take place. Over the remainder of tube 404 insulation such as Alfrax packing is provided as shown at 406. This material is preferably cast into place after insertion of the cooling medium pipes and surrounds said pipe. At the discharge end of the hydrocarbon feed pipe the cooling medium passageway is surrounded by Fiberfrax packing, or similar material. The corebreaker is tapered in this modification to assist in the acceleration of the inert gases which are passed to the reaction section 116 of FIGURE 9 by way of annulus 121 of said figure. The corebreaker is made in this instance of alumina. Although in FIGURE 9 the inert gas is shown introduced parallel to the axis of the apparatus, it is within the scope of the invention to introduce the preheated inert or carrier gas substantially tangentially or transversely to the tapered or inlet end of the corebreaker.

To illustrate the quality of the carbon black made as disclosed herein and to compare its properties with those of other carbon blacks, batches of rubber compound were prepared according to the compounding formula, as follows:

| | Parts by weight |
|---|---|
| Butadiene/styrene rubber [1] | 100 |
| Carbon black | 40 |
| Zinc oxide | 3 |
| BRT #7 [2] | 6 |
| Sulfur | 1.75 |
| Santocure [3] | 0.8 |

[1] The butadiene-styrene rubber is a 71–29 butadiene/styrene copolymer prepared by emulsion polymerization at 122° F. in a potassium persulfate system using a fatty acid soap emulsifier and n-dodecyl mercaptan to give a polymer having a Mooney value (ML-4) of 48.
[2] Refined coal tar product, sp. gr. 1.20–1.25; Engler specific viscosity at 100° C. is 6–9.
[3] N-cyclohexyl-2-benzothiazylsulfenamide sold by Monsanto.

Table II gives properties imparted to a 122° F. rubber by these thermal blacks at 30 minutes' cure at 307° F. and oven agent 24 hours at 212° F.

These thermal blacks made in a two inch diameter by 18 inch reactor using benzene or n-hexane feedstocks exhibited relatively high surface area and low oil absorption indicating that low structure blacks of relatively fine particle size were produced. Carbon black made from benzene possessed a finer particle size and gave better abrasion resistance and much better electrical conductivity than the n-hexane black although the black made from hexane was an acceptable product of the invention. These thermal blacks gave higher modulus and appreciably better abrasion resistance than P-33 (a commercial fine thermal black).

*Table II*

PROPERTIES IMPARTED TO 122° F. RUBBER BY THERMAL CARBON BLACKS, 30 MINUTES' CURE AT 307° F.

| Black | Nitrogen Surface Area, sq.m./g. | pH | Oil Absorption, cc./g. | Benzene Extract, Percent | Compression Set, Percent | 300% Modulus, p.s.i. | Tensile, p.s.i. | Elongation, Percent | 200° F. Maximum Tensile, p.s.i. | Flex Life, M | Shore Hardness | Abrasion Loss, g. | Compounded MS 1½ | Extrusion at 250° F. | |
|---|---|---|---|---|---|---|---|---|---|---|---|---|---|---|---|
| | | | | | | | | | | | | | | in./min. | Rating |
| (Benzene) | 87.6 | 8.0 | 0.96 | 0.08 | 24.3 | 700 | 2,760 | 660 | 1,140 | 5.5 | 51 | 13.18 | 27 | 23.4 | 9 |
| (n-Hexane) | 59.0 | 8.2 | 0.62 | 0.14 | 27.2 | 475 | 2,570 | 740 | 820 | 7.3 | 46 | 17.93 | 24 | 26.6 | 9− |
| A well-known commercial furnace black | 13.6 | 7.6 | 0.56 | 1.64 | 28.5 | 275 | 1,425 | 805 | 250 | 2.6 | 42 | 55.90 | 20 | 21.9 | 8+ |

OVEN AGED, 24 HOURS AT 212° F.

| Black | Nitrogen Surface Area, sq.m./g. | pH | Oil Absorption, cc./g. | Benzene Extract, Percent | Compression Set, Percent | 300% Modulus, p.s.i. | Tensile, p.s.i. | Elongation, Percent | 200° F. Maximum Tensile, p.s.i. | Flex Life, M | Shore Hardness | Abrasion Loss, g. | Compounded MS 1½ | Extrusion at 250° F. | |
|---|---|---|---|---|---|---|---|---|---|---|---|---|---|---|---|
| | | | | | | | | | | | | | | in./min. | Rating |
| (Benzene) | | | | | | 1,360 | 2,780 | 460 | | 1.7 | 60 | 9.67 | | | |
| (n-Hexane) | | | | | | 960 | 2,130 | 480 | | 1.0 | 55.5 | 14.39 | | | |
| A well-known commercial furnace black | | | | | | 480 | 650 | 415 | | 0.3 | 52 | | | | |

From Table II, it will be noted that the carbon black, of the method of the present invention, produces in a cured rubber product as above described certain highly desirable properties. Among these are very greatly increased flex life and greatly decreasd abrasion loss over a well known commercially available carbon black made by a substantially conventional furnace operation. Another notable great improvement has been made in tensile strength. Also, 300 percent modulus has been very greatly increased. The nitrogen surface area, oil absorption and benzene extract results are also quite noteworthy. In other properties, also, the rubber product which was componded, as herein described, compared well with the commercial product.

Generally, although the invention is not to be limited thereto, the size and relative sizes of the various basic components of an apparatus according to the invention are as follows: The reaction 2" I.D. tube containing the corebreaker will be about 60 inches long, the corebreaker will be about 34 inches long and will have an overall diameter of about 2 inches and when tapered at the tapered end will have a diameter of about 1½ inches. The spiral on the corebreaker will have a 2 inch pitch and the space between successive ridges along the corebreaker will be about 1½ inches. The hydrocarbon feed tube will measure about 1/16 inch internal diameter and 3/32 inch outer diameter. It will be seen that the order of sizes are selected for effecting with optimum control the flow of hydrocarbon and heat carrier gas to either desired results by achieving flow rates herein set forth.

Reasonable variation and modification are possible within the scope of the foregoing disclosure, drawings, and the appended claims to the invention, the essence of which is that there have been provided a process and apparatus for producing carbon black from certain organic compounds, preferably hydrocarbons, by flowing such a compound into a hot relatively inert gas flowing in turbulent flow along a curved path whereby superfast transverse dispersion of hydrocarbon across the turbulent relatively inert gas stream is obtained.

I claim:

1. A process for the production of carbon black which comprises in a substantially cylindrical reaction zone; forming an annulus section extending a substantial but not the entire length of said zone, thus leaving at one end of said zone a substantially entirely unobstructed reaction section; flowing a hot relatively inert gas from the other end of said zone through said annulus section turbulently in a curved path into said unobstructed reaction section, providing around said reaction zone a heating zone; further heating said relatively inert gas by indirect heat exchange relationship between it and heat in said heating zone; introducing a feed to be converted to carbon black substantially axially into said reaction section substantially at the place at which said annulus section communicates with one end of said reaction section; in said reaction section immediately transversely dispersing said feed outwardly into said relatively inert gas and immediately converting said feed in said gas to carbon black; removing the reaction product from the other end of said reaction section, cooling the reaction product and recovering carbon black therefrom.

2. A process according to claim 1 wherein the feed is introduced through a feeding zone to said reaction section along the axis of said reaction zone from said other end of said reaction zone surrounded by a temperature regulating zone located within said reaction zone between said annular section and said feeding zone, wherein a temperature regulating medium is flowed through said temperature regulating zone and wherein there is also provided a combustion section to provide said heating zone around said reaction zone.

3. A process according to claim 2 wherein the combustion gases formed in said combustion zone are passed in said annulus around said reaction section and substantially along the entire length of the reaction zone from said combustion section which is around said reaction section to said other end of said combustion zone.

4. A process according to claim 1 wherein the hot relatively inert gas is flowed helically within said annular section and into said reaction section.

5. An apparatus for producing carbon black by contacting a preheated hot relatively inert gas and a feed which is converted to carbon black in a reaction section, which comprises, in combination, a substantially cylindrical hollow combustion means, a reaction tube disposed concentrically within said combustion means and extending substantially the length of said combustion means providing an annulus between said tube and said combustion means, a combustion section in said combustion means at a reaction section of said reaction tube, a seal at one end of said reaction tube and to one side of said combustion section sealing said annulus, the other end of said annulus being provided with means for removing combustion gases therefrom, a corebuster concentrically disposed in said reaction tube extending into and through said other end of the reaction tube up to and determining one end of said reaction section and forming a second annulus, means for passing hot relatively inert gases from said second annulus turbulently in a curved path into said reaction section, means in said second annulus to cause helical motion of said relatively inert gases moving in said second annulus, means for removing and cooling reaction products formed in said reaction section determining the other end of said reaction section, and means for introducing feed to an axial point substantially at said one end of said reaction section in a manner such that said feed is immediately transversely dispersed outwardly into said inert gases as these are discharged from said second annulus into said reaction section.

6. Apparatus according to claim 5 wherein means are provided in said first-mentioned annulus to insure a helical motion of the combustion gases in said first-mentioned annulus.

7. Apparatus according to claim 5 wherein the corebuster is shaped to annularly extend into said reaction section and to surround therein said axial point at which feed is introduced and wherein the extended portion of said corebuster is perforated at a plurality of points surrounding said axial point in a manner to direct gases flowing from said second annulus into contact with feed introduced at said axial point.

References Cited in the file of this patent

UNITED STATES PATENTS

| | | |
|---|---|---|
| 986,489 | Morehead | Mar. 14, 1911 |
| 2,368,827 | Hanson et al. | Feb. 6, 1945 |
| 2,769,692 | Heller | Nov. 6, 1956 |
| 2,773,744 | Antonsen | Dec. 11, 1956 |
| 2,865,717 | Krejci | Dec. 23, 1958 |